United States Patent Office 2,776,220
Patented Jan. 1, 1957

2,776,220
GELATIN FILMS AND CAPSULES MADE THEREFROM

Charles Claude Reed, Pearl River, Lawrence Ritter, Suffern, William Valentine, Spring Valley, and Ernest Chu Yen, Pearl River, N. Y., assignors to American Cyanamid Company, New York, N. Y., a corporation of Maine No Drawing. Application November 30, 1954, Serial No. 472,236

9 Claims. (Cl. 106—136)

This invention relates to novel and improved gelatin films, in general, and, more particularly, to gelatin films moldable into capsules or the like for containing powders, oils, etc.

Hitherto, gelatin capsules have comprised three primary constituents, namely, gelatin water and glycerin. Many varied formulations and compositions have been developed in the past and many of these have found considerable commercial success in the industry. Nevertheless, there still remains substantial room for improvement in the manufacture of such capsules.

For example, in the forming of these capsules, it has frequently been observed that the molded capsules frequently possess too slow a drying rate and consequently, they occasionally adhere to each other and/or to the container, conveyor, or any other object with which they come into contact. To avoid this undesirable adhesive characteristic, the molding or forming apparatus is generally operated at a slower speed to permit a partial hardening or setting of the capsules before they can contact and adhere to each other or to parts of the apparatus.

Additionally, it has also been observed that the gelatin film or web used in such capsule manufacture deteriorates and becomes impaired, particularly when exposed to the elevated temperatures normally encountered in such molding or forming operations and consequently, the film cannot be efficiently reused as often as would be desirable.

Furthermore, gelatin capsules made from prior formulations have not been capable of use with some fillers and materials which possess chemical characteristics and properties undesirably affecting the capsule. The widespread and more universal utilization of such prior products, consequently, has been accordingly limited.

Finally, the strength and toughness of the films previously used was such that occasional breakage and rupture thereof occurred particularly during manufacturing operations and consequently production schedules were disrupted and manufacturing machines were idled during the repair and mending of such faults.

It is, therefore, a principal object of the present invention to provide gelatin films or webs having increased strength and toughness and comprising a novel and improved composition capable of being formed into capsules having faster drying rates, shorter hardening or setting times, greater stability or resistance to deterioration and capable of use with a wide variety of fillers.

It has been discovered that, if the glycerin in prior formulations is replaced partially by polyoxyethylene sorbitol containing a specified number of polyoxyethylene units or by polyethylene glycol of a specified molecular weight or by mixtures thereof, the films or webs obtained from such compositions possess the superior and desirable properties and characteristics referred to above.

More specifically, it has been found that, if from about one-sixth to about five-sixths of the glycerin is replaced by polyoxyethylene sorbitol containing from about 4 to about 40 mols of ethylene oxide per mol of sorbitol or by a polyethylene glycol having a molecular weight of from about 200 to about 800 or by mixtures thereof, superior films or webs are obtained of greater acceptability to the industry.

It is to be noted particularly that the polyoxyethylene sorbitol or polyethylene glycol is not used in addition to the quantities of glycerin previously used nor is it used to replace the glycerin completely but that it is used in lieu of only a part of the glycerin within specified critical limits.

As indicated previously, these critical limits range from about one-sixth to about five-sixths of the glycerin, with the preferred commercial limits being from about one-third to about one-half of the glycerin.

The gelatin film can be produced in several ways and the following general descriptions are set forth to illustrate the preferred methods. It is to be appreciated, however, that such descriptions are not limitative of the present inventive concept and that other equivalent procedures may be used.

The "cold sponge" method is as follows: water, glycerin, polyoxyethylene glycol (or polyoxyethylene sorbitol or mixtures thereof), gelatin and the mixer blades and bowl are chilled. Any dyes, flavors, preservatives, pigments, etc., which are to be used are dissolved in alcohol and all ingredients including the polyethylene glycol or the polyoxyethylene sorbitol but except the gelatin are placed in the mixer bowl and agitated for several, perhaps ten, minutes. The gelatin is then added and agitation is continued until a fine sandy, dry sponge is formed (usually about 45–90 minutes). The entire sponging process is carried out in an open system involving no pressure or vacuum.

The sponge is then melted in a jacketed melt-tank with a screen-covered preheated steam coil supported inside the melter. Again, an open system is employed using no pressure or vacuum. The melt which is obtained may then be stored and aged for approximately 1–4 days and is then ready for the encapsulation process.

The "hot mix melt" method of preparation may also be used and is as follows: the glycerin, polyethylene glycol (or polyoxyethylene sorbitol or mixtures thereof), water, dyes, pigments, preservatives, flavors, etc., are placed in a heated, jacketed mixer and brought to a temperature of from about 80° C. to about 85° C. with agitation. The gelatin is then added and the mixer is covered and sealed. The temperature is then raised to about 100–115° C. with agitation for about one hour, allowing the pressure to increase.

The jacket temperature is then permitted to decrease to about 56° C. and about 2″ vacuum is allowed to accumulate. The gelatin mix is held under the vacuum for about 2 hours. Films made from this melt procedure are ready for immediate encapsulation.

The invention will be further described by the following specific examples which are employed primarily to illustrate preferred embodiments of the inventive concept.

It is to be pointed out that in these examples, the sum of the percentages by weight of gelatin and water used has normally been in the neighborhood of about 46–48% and about 33–35%, respectively, inasmuch as such has been found to be most desirable and preferable. It is to be appreciated, however, that other operative ranges of these constituents may be employed and that from about 25 to about 60 percent of gelatin by weight has been found satisfactory and that from about 60 to about 15 percent of water by weight is similarly acceptable. In the same way, the sum of the percentages of the glycerin, glycol and/or sorbitol used in such formulations has been generally shown as about 17–18 percent by weight as a preferred embodiment but it is to be appreciated that other percentages may be used, depending on the amount of gelatin and water used and that from about 10 to about 24 percent by weight has been found commercially acceptable.

The extent to which the glycerin is replaced depends to a great extent upon the hardness of the film which is desired. Naturally, a film which is too hard and tough and is relatively non-sticky is more difficult to employ in making capsules and consequently care must be exercised in the use of these materials replacing a part of the glycerin due to their hardening properties and characteristics.

EXAMPLE I

The materials used comprised:

| | Parts |
|---|---|
| Gelatin | 47 |
| Glycerin U. S. P. | 10 |
| Polyethylene glycol 600 | 8 |
| Distilled water | 34 |
| Dyes, pigments, flavors, preservatives | 1 |

The distilled water, polyethylene glycol and the glycerin were placed in a liquid heating tank and heated to a temperature of about 180–190° F. The gelatin, dyes, pigments, preservatives and flavors were placed in a blender which was covered and sealed and the materials therein were agitated with the gradual application of vacuum to about 25" or over. The materials in the blender were agitated for 5 minutes at such a vacuum and then the hot liquids from the heating tank were rapidly added thereto with agitation and the gradual application of vacuum to about 26" and a temperature just below the boiling point of the mixture. The application of heat was stopped and the gelatin formulation was ready to pump over for encapsulation when a temperature of about 150° F. was reached.

Satisfactory capsules were made and filled with liquids such as Span 85 (sorbitan trioleate), Tween 85 (sorbitan trioleate polyoxyalkylene derivative), dioxane, polyethylene glycol 400, Tace oil in polyethylene glycol, and chloral hydrate in polyethylene glycol 600 (a 34% solution).

EXAMPLE II

Example I was repeated with the film for making the capsules being prepared from the following ingredients:

| | Grams |
|---|---|
| Gelatin | 115,200 |
| Glycerin U. S. P. | 24,800 |
| polyethylene glycol 600 | 18,400 |
| Distilled water | 83,760 |
| Titanium dioxide | 740 |
| Dyes, preservatives, flavors | 1,520 |
| | 244,420 |

Capsules were made and filled with liquids such as Span 85 (sorbitan trioleate), Tween 85 (sorbitan trioleate polyoxyalkylene derivative), dioxane, polyethylene glycol 400, Tace oil in polyethylene glycol, and chloral hydrate in polyethylene glycol 600 (a 34% solution).

EXAMPLE III

The "cold sponge" method was employed using the following proportions of ingredients in which the polyethylene glycol replaced all of the glycerin.

| | Parts |
|---|---|
| Gelatin, 200 Bloom (Swift) | 48 |
| Polyethylene glycol 600 | 18 |
| Distilled water | 33 |
| Dyes, pigments, flavors, preservatives alcohol (to dissolve) | 1 |

A satisfactory sponge could not be formed from such a composition and the mixture could not be melted down without undesirably forming a two-phase layer system.

EXAMPLE IV

The following formulations were employed to prepare films for producing capsules:

| | Parts |
|---|---|
| (A) Gelatin, 200 Bloom (Swift) | 48 |
| Glycerin U. S. P. | 9 |
| Polyethylene glycol 600 | 9 |
| Water | 34 |
| (B) Gelatin, 200 Bloom (Swift) | 48 |
| Glycerin U. S. P. | 12 |
| Polyethylene glycol 600 | 6 |
| Water | 34 |

Cold sponges were prepared, as previously described and were dry, fine and almost sandy. There was no sticking or lumping on storage up to 4 days. The films made from these formulations set faster, stripped better and generally permitted greater speeds of machine operation. There also was less change of viscosity and the films were run for six consecutive days, reusing the films three times. The films enabled sealing of the following materials:

Span 85 (straight)
Tween 85 (straight)
Dioxane (straight)
Polyethylene glycol 400
Tace oil
34% chloral hydrate in polyethylene glycol 600

The capsules were non-sticky, did not exhibit any twinning, did not stick to trays, were faster drying, were shiny and had a good appearance.

EXAMPLE V

The materials used comprised:

| | Parts |
|---|---|
| (A) Gelatin | 30 |
| Glycerin | 8 |
| P. E. G. 600 | 4 |
| Water | 58 |
| (B) Gelatin | 52 |
| Glycerin | 14 |
| P. E. G. 600 | 7 |
| Water | 27 |

The method described in Example I was followed and satisfactory films were made capable of molding into capsules acceptable to the industry.

EXAMPLE VI

The following formulations were prepared using Example I as a basis but substituting the materials as indicated (glycerin+substituted material equals 18 parts):

| Material | Parts Glycerin Substituted | Remarks |
|---|---|---|
| Polyethylene Glycol 600 | 18 | Separated into two layers, unsatisfactory. |
| Do | 9 | Strong, elastic film, good capsules formed. |
| Do | 6 | Strong elastic film, good stripping, excellent capsules made. |
| Polyethylene Glycol 200 | 9 | Excellent film, good capsules. |
| Polyethylene Glycol 400 | 9 | Strong, elastic, non-sticky film, good capsules. |
| Polyethylene Glycol 200 | 3 | Excellent film, good capsules. |
| Polyethylene Glycol 800 | 9 | Non-sticky, elastic, strong film, good capsules. |
| Atlas G-2320 (20 units) | 9 | Excellent film, good capsules. |
| Do | 6 | Air-free, strong, very good film, good capsules. |
| Do | 3 | Excellent, non-tacky, air-free, strong film, good stripping, 4.2 R. P. M., good capsules. |
| Atlas G-2240 | 6 | Fairly air-free, quite strong film, good capsules. |
| Atlas G-2330 (30 units) | 6 | Strong, elastic film, good capsules. |
| Atlas G-2004 (4 units) | 6 | Air-free, strong elastic film, non-sticky, good capsules. |
| Do | 9 | Do. |
| 2% Polyethylene Glycol 600; 4% Atlas G-2320 (20 units). | 6 | Good stripping, tough film, excellent stability of gelatin. |
| 6% Polyethylene Glycol 600; 3% Atlas G-2320. | 9 | Stripping fast, tough film, Good "Gevral" (geriatric Vitamin-Mineral-Protein-Supplement) Capsules. |

The Atlas G formulations are polyoxyethylene sorbitols with various amounts (from about 4 to about 40) of polyoxyethylene groups.

The following comparative tests at 80° F. and 10% relative humidity indicate the superior drying characteristics of the capsules made from the compositions of the present invention. (The acceptable moisture standard is 35 mgms. moisture per capsule.)

*Sample A—48 parts gelatin, 18 parts glycerin, 34 parts water*

| Drying hours: | Mgms. moisture per capsule |
|---|---|
| 8 | 62.5 |
| 16 | 59.0 |
| 24 | 49.0 |
| 32 | 42.5 |
| 40 | 42.5 |
| 48 | 41.0 |
| 80 | 30.0 |

*Sample B.—7.5 parts glycerin replaced by P. E. G. 600*

| Drying hours: | Mgms. moisture per capsule |
|---|---|
| 8 | 59.0 |
| 16 | 57.5 |
| 24 | 50.0 |
| 28 | 35.0 |

As a consequence of the hardening action of the polyethylene glycol, the capsules of Sample B quickly set and did not adhere to each other to form "twins." A few capsules did temporarily stick to each other but were easily separated without tearing, breaking or rupturing by shaking. The capsules of Sample A, on the other hand, did adhere to each other considerably and could not be separated by shaking. Efforts to separate them by more severe means resulted to breaking, tearing, and/or rupturing of the capsules.

Additionally, in Sample A, capsules were noted possessing wrinkles and "warts" as well as spotting, shading, discoloring and non-uniformity in appearance. The capsules of Sample B did not possess any wrinkles or "warts" and did not exhibit any spotting, shading discoloring or non-uniformity in appearance.

Although we have described several specific examples of our invention, we consider the case not to be limited thereby nor to the specific substances mentioned therein but to include various other equivalent compounds of similar constitution as set forth in the claims appended hereto. It is understood that any suitable changes or variations may be made without departing from the spirit or scope of the inventive concept.

What we claim is:

1. A thin gelatin film for the formation of soft gelatin capsules comprising from about 25 to about 60 percent gelatin, from about 60 to about 15 percent water, from about 3 to about 15 percent glycerin and from about 3 to about 15 percent of a member of the group consisting of polyoxyethylene sorbitol containing from about 4 to about 40 polyoxyethylene units and polyethylene glycol having a molecular weight of from about 200 to about 800 and mixtures thereof, all percentages being by weight.

2. A thin gelatin film for the formation of soft gelatin capsules comprising from about 25 to about 60 percent gelatin, from about 60 to about 15 percent water, from about 10 to about 24 percent of a member of the group consisting of glycerin, polyoxyethylene sorbitol containing from about 4 to 40 polyoxyethylene units and polyethylene glycol having a molecular weight of from about 200 to about 800, and mixtures thereof, said glycerin being present in an amount from 3 to 15 percent, said percentages being by weight.

3. A thin gelatin film for the formation of soft gelatin capsules comprising about 46–48 percent gelatin, about 33–35 percent water, about 3–15 percent glycerin and about 3–15 percent of a member of the group consisting of polyoxyethylene sorbitol containing from about 4 to about 40 polyoxyethylene units and polyethylene glycol having a molecular weight of from about 200 to about 800 and mixtures thereof, all percentages being by weight.

4. A thin gelatin film for the formation of soft gelatin capsules comprising about 46–48 percent gelatin, about 33–35 percent water, about 3–15 percent glycerin and about 3–15 percent of a member of the group consisting of polyoxyethylene sorbitol containing 20 polyoxyethylene units and polyethylene glycol having a molecular weight of about 600, and mixtures thereof, all percentages being by weight.

5. A thin gelatin film for the formation of soft gelatin capsules comprising about 46–48 percent gelatin, about 33–35 percent water, about 3–15 percent glycerin and about 3–15 percent polyoxyethylene sorbitol containing 20 polyoxyethylene units, all percentages being by weight.

6. A thin gelatin film for the formation of soft gelatin capsules comprising about 46–48 percent gelatin, about 33–35 percent water, about 3–15 percent glycerin and about 3–15 percent polyethylene glycol having a molecular weight of about 600, all percentages being by weight.

7. A soft, gelatin capsule formed from a gelatin film comprising from about 25 to about 60 percent gelatin, from about 60 to about 15 percent water, from about 3 to about 15 percent glycerin and from about 3 to about 15 percent of a member of the group consisting of polyoxyethylene sorbitol containing from about 4 to about 40 polyoxyethylene units and polyethylene glycol having a molecular weight of from about 200 to about 800 and mixtures thereof, all percentages being by weight.

8. A soft gelatin capsule formed from a gelatin film comprising from about 25 to about 60 percent gelatin, from about 60 to about 15 percent water, from about 3 to about 15 percent glycerin and from about 3 to about 15 percent polyoxyethylene sorbitol containing from about 4 to about 40 polyoxyethylene units, all percentages being by weight.

9. A soft gelatin capsule formed from a gelatin film comprising from about 25 to about 60 percent gelatin, from about 60 to about 15 percent water, from about 3 to 15 percent glycerin and from about 3 to about 15 percent of polyethylene glycol having a molecular weight of from about 200 to about 800, all percentages being by weight.

References Cited in the file of this patent

UNITED STATES PATENTS

| 216,832 | Collins | June 24, 1879 |
| 2,121,131 | Power | June 21, 1938 |
| 2,164,494 | Brown et al. | July 4, 1939 |
| 2,616,812 | Kramsky et al. | Nov. 4, 1952 |

OTHER REFERENCES

"Carbowax" by Carbide v. Carbon Chem. Co., New York (1946), p. 4.